United States Patent [19]
Southgate

[11] Patent Number: 5,968,161
[45] Date of Patent: *Oct. 19, 1999

[54] FPGA BASED CONFIGURABLE CPU ADDITIONALLY INCLUDING SECOND PROGRAMMABLE SECTION FOR IMPLEMENTATION OF CUSTOM HARDWARE SUPPORT

[75] Inventor: Timothy James Southgate, Redwood City, Calif.

[73] Assignee: Altera Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/797,585

[22] Filed: Feb. 7, 1997

Related U.S. Application Data

[60] Provisional application No. 60/024,994, Aug. 29, 1996.

[51] Int. Cl.$^6$ ........................................ G06F 9/00
[52] U.S. Cl. ................................. 712/37; 712/43
[58] Field of Search ........................ 395/500, 376, 395/561, 911, 800.37, 800.43; 712/37, 43, 200, 220

[56] References Cited

U.S. PATENT DOCUMENTS

| | | | |
|---|---|---|---|
| 5,361,373 | 11/1994 | Gilson | 395/800.1 |
| 5,535,406 | 7/1996 | Kolchinsky | 395/800.1 |
| 5,684,980 | 11/1997 | Casselman | 395/500 |
| 5,748,979 | 5/1998 | Trimberger | 395/376 |
| 5,784,636 | 7/1998 | Rupp | 395/376 |
| 5,819,064 | 10/1998 | Razdan et al. | 395/376 |

OTHER PUBLICATIONS

Dillion, Paul C., *Adaptive Hardware Becomes a Reality using Electrically Reconfigurable Arrays (ERAs)*, GEC Plessey Semiconductor, Dec. 1990, pp. 2/1 through 2/5.

Hastie et al., *The Implementation of Hardware Subroutines on Field Programmable Gate Arrays*, Proceedings of the IEEE 1990 Custom Integrated Circuits Conference, May 13–16, 1990, pp. 31.4.1 through 31.4.4.

Faura et al., *A New Field Programmable System–on–a–chip for Mixed Signal Integration*, date unknown, publisher unknown, one page.

Wirthlin et al., *DISC: The dynamic instruction set computer*, Department of Electrical and Computer Engineering, Brigham Young University, date unknown, 12 pages.

Wirthlin et al., *The Nano Processor: a Low Resource Reconfigurable Processor*, IEEE Workshop on FPGAs for Custom Computing Machines, Apr. 10–13, 1994, pp. 1–8.

(List continued on next page.)

*Primary Examiner*—Richard L. Ellis
*Attorney, Agent, or Firm*—Limbach & Limbach L.L.P.

[57] ABSTRACT

An integrated programmed logic circuit for performing complementary hardware and software based logic functions includes multiple programmed circuit portions. The portion programmed for performing the software based logic functions is programmably configured in a circuit configuration which includes and changes among multiple operation configuration states in accordance with its execution of its instructions. The portion programmed for performing the hardware based logic functions is programmably configured in a circuit configuration which remains in a single operation configuration state prior to, during and subsequent to its processing of data. Hence, the division of processing, i.e., hardware based and software based, can be designed as most appropriate for the particular application, e.g., more hardware based and less software based processing when speed is more important, and more software based and less hardware based processing when processing flexibility is more important.

27 Claims, 7 Drawing Sheets

OTHER PUBLICATIONS

Wirthlin et al., *Sequencing Run–Time Reconfigured Hardware with Software*, Department of Electrical and Computer Engineering, Brigham Young University, date unknown, 7 pages.

Cabestany et al. *FIPSOC. A Novel Mixed Programmable Device for System Prototyping*, date unknown, publisher unknown, 6 pages.

Faura et al., *Multicontext Dynamic Reconfiguration and Real Time Probing on a Novel Mixed Signal Programmable Device with On–Chip Microprocessor*, date unknown, publisher unknown, 10 pages.

DeHon, André, *Dynamically Programmable Gate Arrays: A Step Toward Increased Computational Density*, FPD'96 Fourth Canadian Workshop of Field–Programmable Devices, May 13–14, 1996, 8 pages.

Faura et al., *FIPSOC: A New Concept to Mixed Signal Integration*, date unknown, publisher unknown, 5 pages.

Faura et al., *A Novel Mixed Signal Programmable Device with On–Chip Microprocessor*, date unknown, publisher unknown, 4 pages.

Wirthlin et al., *A Dynamic Instruction Set Computer*, IEEE Workshop on FPGAs for Custom Computing Machines, Apr. 19–21, 1995, pp. 1–9.

|   | 0 | 1 | 2 | 3 | 4 | 5 | 6 | 7 |
|---|---|---|---|---|---|---|---|---|
| 0 | NOP | WAIT | SWI | RET | RETI | | | |
| 1 | POP M | POP [M+I] | PUSH I | PUSH M | PUSH [M+I] | CALL I | CALL M | CALL [M+I] |
| 2 | ST M SP | ST M FL | | | ST [M+I] SP | ST [M+I] FL | | |
| 3 | LD SP [M+I] | LD FL [M+I] | | | | | | |
| 4 | BRA I | BGR I | BGE I | BEQ I | BNE I | BLS I | BLE I | BNE I |
| 5 | BRA M | BGR M | BGE M | BEQ M | BNE M | BLS M | BLE M | BNE M |
| 6 | BRA [M+I] | BGR [M+I] | BGE [M+I] | BEQ [M+I] | BNE [M+I] | BLS [M+I] | BLE [M+I] | BNE [M+I] |
| 7 | | | | | | | | |
| 8 | LSL M | | ROL M | | LSR M | ASR M | ROR M | |
| 9 | LSL [M+I] | | ROL [M+I] | | LSR [M+I] | ASR [M+I] | ROR [M+I] | |
| A | SUB M I | ADD M I | CMP M I | | | | SBB M I | ADC M I |
| B | SUB M M | ADD M M | CMP M M | | | | SBB M M | ADC M M |
| C | SUB M [M+I] | ADD M [M+I] | CMP M [M+I] | | | | SBB M [M+I] | ADC M [M+I] |
| D | SUB [M+I] I | ADD [M+I] I | CMP [M+I] I | | | | SBB [M+I] I | ADC [M+I] I |
| E | SUB [M+I] M | ADD [M+I] M | CMP [M+I] M | | | | SBB [M+I] M | ADC [M+I] M |
| F | SUB [M+I] [M+I] | ADD [M+I] [M+I] | CMP [M+I] [M+I] | | | | SBB [M+I] [M+I] | ADC [M+I] [M+I] |
|   | 1 / 0001 | 2 / 0002 | 4 / 0004 | 8 / 0008 | 16 / 0010 | 32 / 0020 | 64 / 0040 | 128 / 0080 |

FIGURE 2A

| | 8 | 9 | A | B | C | D | E | F |
|---|---|---|---|---|---|---|---|---|
| 0 | | | | | | | | |
| 1 | | | | | | | | |
| 2 | LD SP I | LD FL I | | | LD SP M | LD FL M | | |
| 3 | | | | | | | | |
| 4 | BPL I | BIS I | BIC I | | | | | |
| 5 | BPL M | BIS M | BIC M | | | | | |
| 6 | BPL [M+I] | BIS [M+I] | BIC [M+I] | | | | | |
| 7 | | | | | | | | |
| 8 | | | DEC M | INC M | NEG M | | | NOT M |
| 9 | | | DEC [M+I] | INC [M+I] | NEG [M+I] | | | NOT [M+I] |
| A | | MOV M I | | | AND M I | OR M I | XOR M I | |
| B | | MOV M M | | | AND M M | OR M M | XOR M M | |
| C | | MOV M [M+I] | | | AND M [M+I] | OR M [M+I] | XOR M [M+I] | |
| D | | MOV [M+I] I | | | AND [M+I] I | OR [M+I] I | XOR [M+I] I | |
| E | | MOV [M+I] M | | | AND [M+I] M | OR [M+I] M | XOR [M+I] M | |
| F | | MOV [M+I] [M+I] | | | AND [M+I] [M+I] | OR [M+I] [M+I] | XOR [M+I] [M+I] | |
| | 256 | 512 | 1024 | 2048 | 4096 | 8192 | 16384 | 32768 |
| | 0100 | 0200 | 0400 | 0800 | 1000 | 2000 | 4000 | 8000 |

FIGURE 2B

|  | Micro | Minimal | Slow | Full |
|---|---|---|---|---|
| LCELLs | 206 | 241 | 390 | 443 |
| Pins |  |  |  |  |
| intn |  |  | X | X |
| holdn |  |  | X | X |
| Opcodes |  |  |  |  |
| NOP | X | X | X | X |
| WAIT |  |  | X | X |
| SWI |  |  | X | X |
| RET |  | X | X | X |
| RETI |  |  | X | X |
| POP M |  | X | X | X |
| POP [M+I] |  |  |  | X |
| PUSH I |  | X | X | X |
| PUSH M |  |  | X | X |
| PUSH [M+I] |  |  |  | X |
| CALL I |  | X | X | X |
| CALL M |  |  | X | X |
| CALL [M+I] |  |  |  | X |
| ST M |  |  | X | X |
| ST [M+I] |  |  |  | X |
| LD I |  |  |  | X |
| LD M |  |  | X | X |
| LD [M+I] |  |  |  | X |
| JUMP I | X | X | X | X |
| JUMP M |  |  | X | X |
| JUMP [M+I] |  |  |  | X |
| ALU M | X | X | X | X |
| ALU [M+I] |  |  |  | X |
| ALU M I | X | X | X | X |
| ALU M M | X | X | X | X |
| ALU M [M+I] |  |  | X | X |
| ALU [M+I] I |  |  |  | X |
| ALU [M+I] M |  |  | X | X |
| ALU [M+I] [M+I] |  |  |  | X |

FIGURE 4

WIDTH = 8;
DEPTH = 128;

ADDRESS_RADIX = HEX;
DATA_RADIX = HEX;

CONTENT BEGIN

| | | | | |
|---|---|---|---|---|
| 0 | : | 10; | -- Reset vector | |
| 1 | : | 00; | | |
| 2 | : | 00; | | |
| 3 | : | 00; | | |
| 4 | : | 00; | | |
| 5 | : | 00; | | |
| 6 | : | 00; | | |
| 7 | : | 00; | | |
| 8 | : | 00; | -- count | RMB 1 |
| 9 | : | 00; | -- value | RMB 1 |
| a | : | 00; | | |
| b | : | 00; | | |
| c | : | 00; | | |
| d | : | 00; | | |
| e | : | 00; | | |
| f | : | 00; | | |
| 10 | : | A9; | -- start: | MOV count, 0 |
| 11 | : | 00; | | |
| 12 | : | 08; | | |
| 13 | : | A2; | -- loop: | CMP count, 128 |
| 14 | : | 80; | | |
| 15 | : | 08; | | |
| 16 | : | 43; -- | | BEQ start |
| 17 | : | 10; | | |
| 18 | : | B9; -- | | MOV value, count |
| 19 | : | 08; | | |
| 1a | : | 09; | | |
| 1b | : | 80; -- | | SHL value |
| 1c | : | 09; | | |
| 1d | : | E9; -- | | MOV [count+80], value |
| 1e | : | 09; | | |
| 1f | : | 08; | | |
| 20 | : | 80; | | |
| 21 | : | 88; -- | | INC count |
| 22 | : | 08; | | |
| 23 | : | 40; -- | | BRA loop |
| 24 | : | 13; | | |

FIGURE 5

FPGA BASED CONFIGURABLE CPU ADDITIONALLY INCLUDING SECOND PROGRAMMABLE SECTION FOR IMPLEMENTATION OF CUSTOM HARDWARE SUPPORT

RELATED APPLICATIONS

This application claims the benefit of U.S. Provisional Application No. 60/024,994, filed Aug. 29, 1996, and entitled "Configurable CPU For Programmable Logic Devices."

BACKGROUND OF THE INVENTION

1. Field of the Invention

The present invention relates to integrated circuits having sections designed for performing specific dedicated processing functions and other sections designed for performing multiple different processing functions in accordance with various input instructions, and in particular, to such integrated circuits as implemented with electrically programmable logic devices (PLDs).

2. Description of the Related Art

Digital electronic systems often include dedicated hardware in combination with a central processor unit (CPU) and software to achieve the desired data processing, as represented in FIG. 1. The two general types of implementation methods can be characterized as follows: hardware implementations which are fast but difficult to modify, as well as expensive; and software implementations which are slower but simpler to modify, as well as significantly less expensive.

Many circuit designers tend to use the CPU more often because it offers less expensive yet more flexible alternatives for implementing various processing functions. However, an important goal in designing such systems is that of the efficient division of the processing tasks between hardware-based and software-based solutions. Such division of processing tasks must be done early in the design process since modifying the implementation later will be difficult and expensive, and further, will often require that additional hardware be added to an existing circuit board design which already contains the original system.

Accordingly, it would be desirable to have a digital electronic system in which the hardware-based and software-based processing functions can be more quickly and easily, and, therefore, more economically, modified in accordance with the particular application.

SUMMARY OF THE INVENTION

An integrated programmed logic circuit for performing complementary hardware- and software-based logic functions in accordance with the present invention provides for significant flexibility in the division of the processing functions to be performed in any particular application. For example, the circuit can be programmed to perform more hardware-based and less software-based processing when speed is more important, or alternatively, to perform more software-based and less hardware-based processing when processing flexibility is more important.

In accordance with one embodiment of the present invention, an integrated programmed logic circuit for performing complementary hardware and software-based logic functions includes multiple programmed circuit portions. One of the programmed circuit portions is programmably configured in a first programmed circuit configuration to receive and execute a set of instructions and in accordance therewith receive and process a set of input data and in accordance therewith provide a set of output data. This first programmed circuit configuration includes and changes among multiple operation configuration states in accordance with its execution of instructions. Another one of the programmed circuit portions is programmably configured in a second programmed circuit configuration to receive and process another set of input data and in accordance therewith provide another set of output data. This second programmed circuit configuration remains in a single operation configuration state prior to, during and subsequent to its processing of input data.

In accordance with another embodiment of the present invention, a method of programming an integrated programmable logic circuit for performing complementary hardware and software-based logic functions includes the steps of: programming a first circuit portion in a first programmed circuit configuration to receive and execute a set of instructions and in accordance therewith receive and process a set of input data and in accordance therewith generate a set of output data; and programming a second circuit portion in a second programmed circuit configuration to receive and process another set of input data and in accordance therewith generate another set of output data. The first programmed circuit configuration includes and changes among multiple operation configuration states in accordance with its execution of instructions. The second programmed circuit configuration remains in a single operation configuration state prior to, during and subsequent to its processing of input data.

These and other features and advantages of the present invention will be understood upon consideration of the following detailed description of the invention and the accompanying drawings.

BRIEF DESCRIPTION OF THE DRAWINGS

FIG. 2 is a listing of opcodes supported by a configurable CPU (PCPU) contained within a programmable logic device (PLD).

FIG. 4 is a table representing how CPU size varies with the number of instructions supported.

FIG. 5 is a listing of assembled object code for a PCPU in accordance with one embodiment of the present invention.

DETAILED DESCRIPTION OF THE INVENTION

In accordance with the present invention, PLDs are used in a hardware and software co-design for implementing hardware and software processing combinations. A configurable CPU is implemented inside the PLD, along with other circuitry programmed for performing dedicated hardware tasks. The configurable CPU is configurable in a number of ways, including, but not limited to, the following:
1. Data width
2. Address width
3. Number of instructions (e.g., can the CPU multiply? what are the addressing modes?)
4. Type of instructions (e.g., 6502 compatible)
5. Complexity of interrupt handling
6. Speed/Area/Latency trade-offs In accordance with the present invention, with both hardware- and software-based processing functions contained entirely within a PLD, it is a relatively simple matter to modify the division of processing tasks between them due to the inherent flexibility of programmable logic. Hence, when seeking to obtain the most efficient use of the PLD resources, the CPU can be reconfigured with respect to the functionality it provides and, consequently, the amount of resources it consumes with the PLD. For example, if it is determined that, for reasons of operational speed, a multiplier function is best performed with dedicated hardware, the CPU need not be configured to include such multiplier function.

Figure 1:
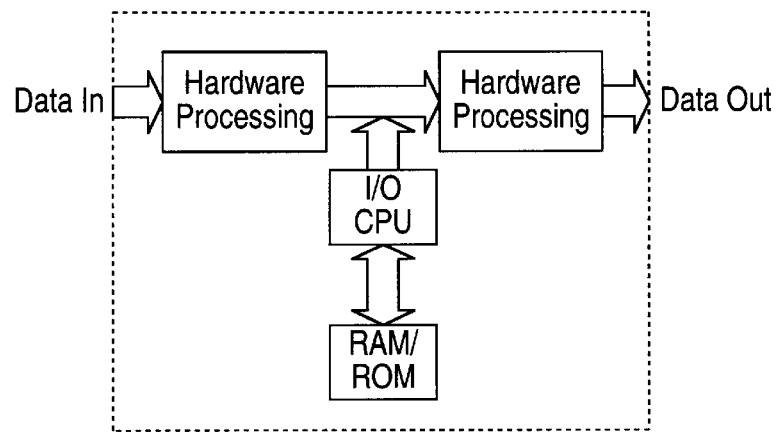
FIG. 1 represents a conventional digital electronic system which includes dedicated hardware in combination with a CPU and software.
Figure 3:
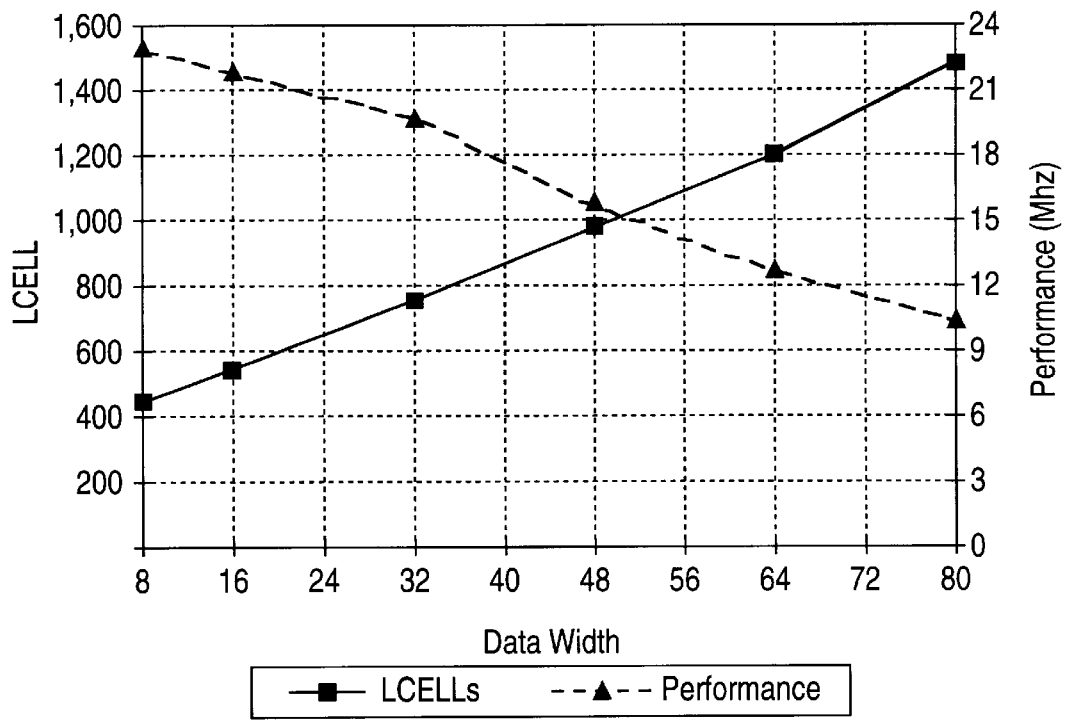
FIG. 3 is a graph representing how CPU performance and size vary with data width.

A PCPU in accordance with one embodiment of the present invention is a full functional hardware description language (HDL) design that implements a parameterized CPU. An example listing of such HDL source code (using the HDL of the assignee, Altera Corporation) is given in Appendix A (the contents of which are hereby incorporated by reference). The opcodes (based approximately upon the Motorola 6805 microprocessor (as supported by this design) are shown in FIG. 2. This PCPU design can be configured in the following ways:
1. Data width
2. Code address space
3. Input/Output address space
4. Support for interrupts
5. Support for input/output wait states
6. Supported instruction set By making adjustments to the values of the parameters listed above, the implementation size and performance of this CPU can be extensively modified. FIG. 3 illustrates how the performance and size of such a PCPU will vary with data width. For example, an 8-bit PCPU can be implemented in approximately 450 logic cells and run with a clock rate of approximately 22 MHz, while a 64-bit PCPU can be implemented in approximately 1200 logic cells and run with a clock rate of approximately 13 MHz.

FIG. 4 illustrates how the size of this PCPU varies with the number of supported instructions. For example, the smallest useful PCPU ("micro") can be implemented in 206 logic cells, while a PCPU with all instructions and features enabled ("full") requires 443 logic cells. Most applications, however, do not require all instructions and, therefore, will require fewer logic cells. Smaller PCPUs can also run at considerably higher clock rates (e.g., a 206 logic cell PCPU can run with a clock rate of approximately 40 MHz).

Figure 6:
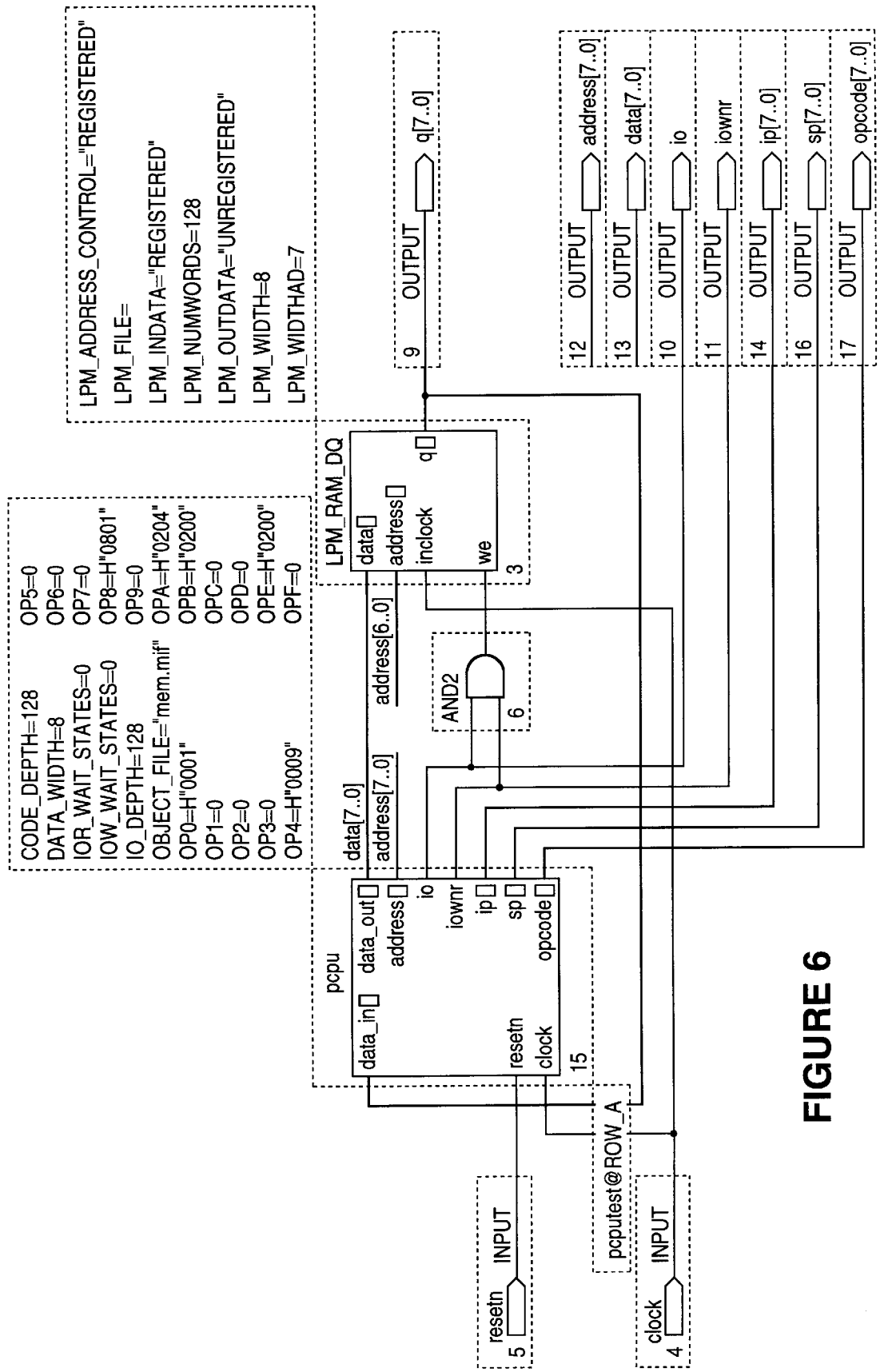
FIG. 6 is a schematic demonstrating the use of a PCPU in accordance with one embodiment of the present invention.

The object code for the PCPU can be assembled manually or through the use of an automated code assembler. During such code assembly, the optimum parameter values for the program to be processed can also be determined. FIG. 5 illustrates an example of some PCPU object code manually assembled, while FIG. 6 illustrates a schematic showing how such an example of a PCPU in accordance with one embodiment of the present invention can be used.

Figure 7:
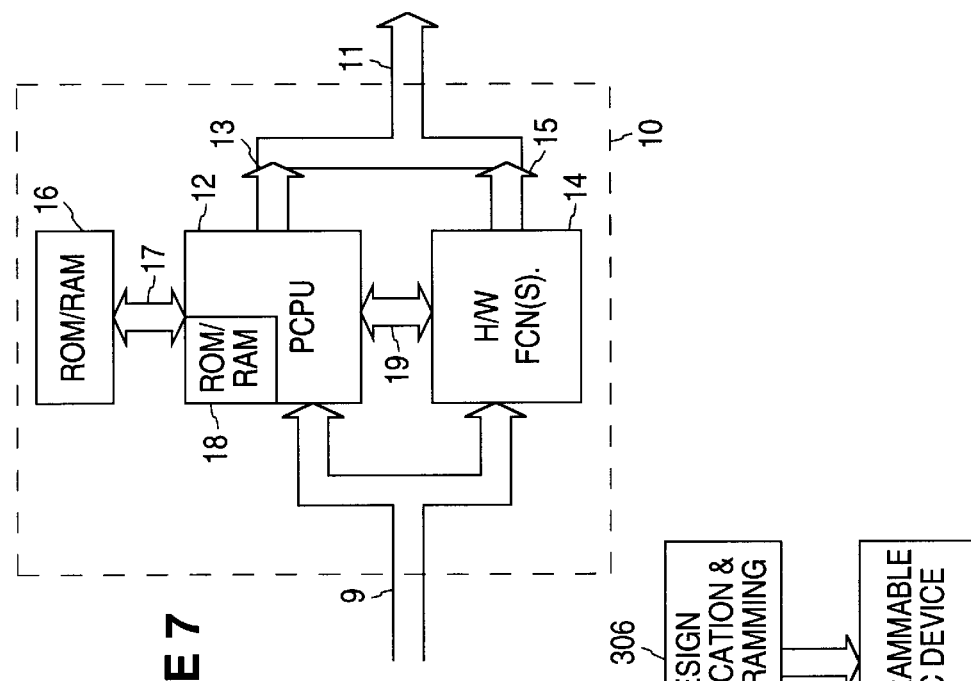
FIG. 7 is a functional block diagram of a PCPU in accordance with one embodiment of the present invention.

Referring to FIG. 7, an integrated programmed logic circuit for performing complementary hardware- and software-based logic functions includes an integrated PLD 10 in which a PCPU 12 with internal memory (e.g., ROM and/or RAM) 18, hardware function block(s) 14 and, if desired, external memory (e.g., ROM and/or RAM) 16 are programmed (discussed in more detail below). Configured in this manner, the PCPU 12, hardware function block(s) 14 and memory 18, 16 together form a microcomputer, with the PCPU 12 forming the CPU thereof.

Input signals 9, which include address information, data, clocks, interrupt signals, etc., are received by the PCPU 12 and hardware function block(s) 14. The PCPU 12, in accordance with its instructions received via the input signals 9 processes data which is either also received via the input signals 9, via signals 17 exchanged with the memory 16 or via signals 19 exchanged with the hardware function block (s) 14. Similarly, the hardware function block(s) 14 process data received via the input signals 9 in accordance with instructions and/or other data received via signals 19 exchanged with the PCPU 12. The output data 13, 15 from the PCPU 12 and hardware function block(s) 14 form the output data 11 of the PLD 10.

A PLD configured in accordance with the present invention can be implemented using any type of PLD, many of which are well known in the art, such as a field programmable gate array (FPGA), a system programmable gate array (SPGA), a programmable memory circuit (e.g., erasable programmable read only memory (EPROM)), a programmable array logic circuit (PAL) or a programmable logic array circuit (PLA).

Figure 8:
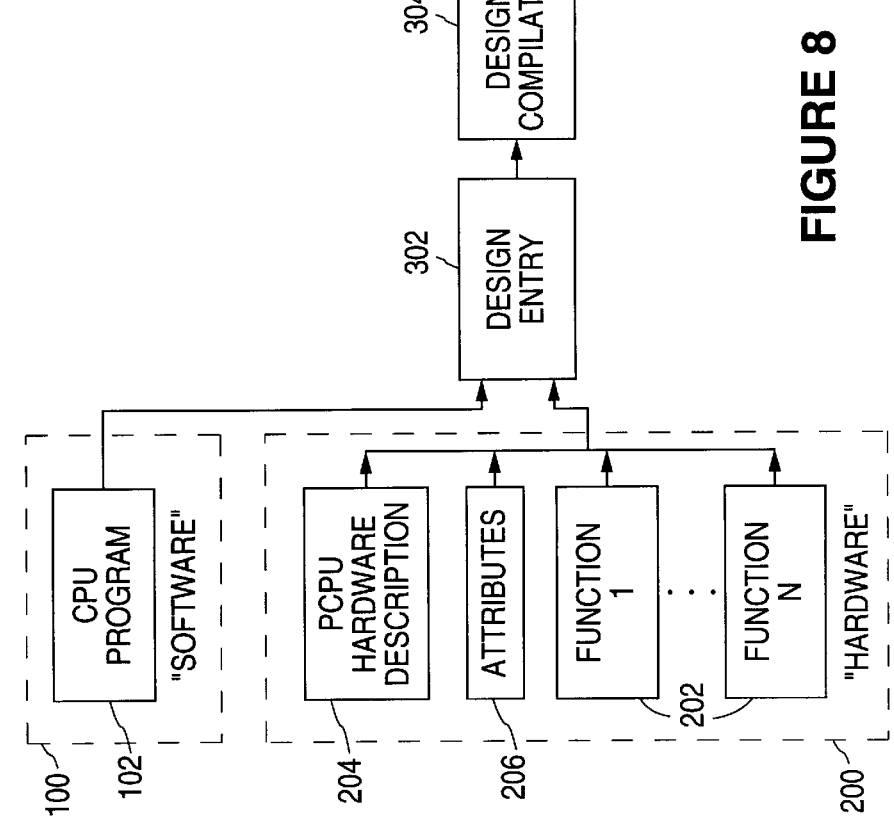
FIG. 8 represents the steps used in designing and programming a PLD containing a PCPU in accordance with the present invention.

Referring to FIG. 8, the process by which a PLD 10 can be programmed in accordance with the present invention can be represented as shown. Initially, design elements and/or considerations which pertain to the software 100 and hardware 200 aspects of the design are established. With respect to the software 100, the CPU program 102 is established. With respect to the hardware 200, the various hardware function block(s) 202, PCPU hardware description 204 and attributes 206 are established. For example, as noted above, if speed is of particular concern, one of the hardware function block(s) 202 can be a dedicated multiplier function.

Once the software 100 and hardware 200 elements have been established, they are combined into a composite design during a design entry phase 302. Such design entry can be accomplished using any of many well known electronic design automation techniques, including graphic design entry, text design entry (e.g., HDL), waveform design entry, hierarchical design entry and/or floorplan editing. Once design entry 302 is completed, the design is compiled during a design compilation phase 304. Such compiling can be done in accordance with any of many well known compilation techniques.

The compiled design is then verified for programming during a design verification and programming phase 306. During this phase 306, simulations can be performed to ensure the functionality and integrity of the design. Following verification, the PLD 10 is programmed and tested. Such programming and testing can be done using any of many well known programming and testing techniques, depending upon the type of PLD 10 used.

Once this design and programming is completed, the PLD 10 will have, primarily, two programmed circuit portions. One of the portions, i.e., the PCPU, in accordance with its programming, will be configured to receive and execute its instructions and in accordance therewith receive and process its input data to provide its output data. Such a circuit portion will be programmed in a circuit configuration which includes and changes among multiple operation configuration states in accordance with the execution of the instructions. The second portion, i.e., the hardware function block(s), in accordance with its programming, will be configured to receive and process its input data to provide its output data. This portion has a circuit configuration which remains in a single, or dedicated, operation configuration state prior to, during and subsequent to the processing of its input data (e.g., as a dedicated multiplier circuit, as noted above).

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated programmed logic circuit, said integrated programmed logic circuit comprising:
   a first programmed circuit portion configured as a central processing unit in a first programmed circuit configuration to receive and execute a plurality of instructions from a fixed, predefined instruction set and in accordance therewith receive and process a first plurality of input data and in accordance therewith provide a first plurality of output data, wherein said first programmed circuit configuration includes and changes among a plurality of operation configuration states in accordance with said execution of said plurality of instructions; and
   a second programmed circuit portion selectably and fixedly configured in a second programmed circuit configuration to receive and process a second plurality of input data and in accordance therewith provide a second plurality of output data, wherein said second programmed circuit configuration fixedly remains in a selectable single operation configuration state prior to, during and subsequent to said processing of said second plurality of input data, and wherein said selectable single operation configuration state is defined in accordance with a selectable and subsequently fixed subset of instructions from said fixed, predefined instruction set.

2. The apparatus of claim 1, wherein said integrated programmed logic circuit further comprises a third programmed circuit portion which is coupled to said first programmed circuit portion and is configured to provide thereto a portion of said plurality of instructions.

3. The apparatus of claim 1, wherein said integrated programmed logic circuit comprises a field programmable gate array.

4. The apparatus of claim 1, wherein said integrated programmed logic circuit comprises a system programmable gate array.

5. The apparatus of claim 1, wherein said integrated programmed logic circuit comprises a programmable memory circuit.

6. The apparatus of claim 5, wherein said programmable memory circuit comprises an erasable programmable read only memory.

7. The apparatus of claim 1, wherein said integrated programmed logic circuit comprises a programmable array logic circuit.

8. The apparatus of claim 1, wherein said integrated programmed logic circuit comprises a programmable logic array circuit.

9. The apparatus of claim 1, wherein said apparatus comprises a computer in which said integrated programmed logic circuit is incorporated.

10. A method of providing an apparatus including an integrated programmed logic circuit, said method comprising the steps of:
    providing a first programmed circuit portion configured as a central processing unit in a first programmed circuit configuration for performing the step of receiving and executing a plurality of instructions from a fixed, predefined instruction set and in accordance therewith receiving and processing a first plurality of input data and in accordance therewith generating a first plurality of output data, wherein said first programmed circuit configuration includes and changes among a plurality of operation configuration states in accordance with said execution of said plurality of instructions; and
    providing a second programmed circuit portion selectably and fixedly configured in a second programmed circuit configuration for performing the step of receiving and processing a second plurality of input data and in accordance therewith generating a second plurality of output data, wherein said second programmed circuit configuration fixedly remains in a selectable single operation configuration state prior to, during and subsequent to said processing of said second plurality of input data, and wherein said selectable single operation configuration state is defined in accordance with a selectable and subsequently fixed subset of instructions from said fixed, predefined instruction set.

11. The method of claim 10, further comprising the step of providing a third programmed circuit portion which is coupled to said first programmed circuit portion and is configured to provide thereto a portion of said plurality of instructions.

12. The method of claim 10, wherein said steps of providing said first and second programmed circuit portions together comprise providing a field programmable gate array.

13. The method of claim 10, wherein said steps of providing said first and second programmed circuit portions together comprise providing a system programmable gate array.

14. The method of claim 10, wherein said steps of providing said first and second programmed circuit portions together comprise providing a programmable memory circuit.

15. The method of claim 14, wherein said step of providing a programmable memory circuit comprises providing an erasable programmable read only memory.

16. The method of claim 10, wherein said steps of providing said first and second programmed circuit portions together comprise providing a programmable array logic circuit.

17. The method of claim 10, wherein said steps of providing said first and second programmed circuit portions together comprise providing a programmable logic array circuit.

18. The method of claim 10, wherein said method of providing said apparatus comprises providing a computer in which said integrated programmed logic circuit is incorporated.

19. A method of programming an apparatus including an integrated programmable logic circuit, said method comprising the steps of:

programming a first circuit portion of an integrated programmable logic circuit as a central processing unit in a first programmed circuit configuration to receive and execute a plurality of instructions from a fixed, predefined instruction set and in accordance therewith receive and process a first plurality of input data and in accordance therewith generate a first plurality of output data, wherein said first programmed circuit configuration includes and changes among a plurality of operation configuration states in accordance with said execution of said plurality of instructions; and selectably and fixedly programming a second circuit portion of said integrated programmable logic circuit in a second programmed circuit configuration to receive and process a second plurality of input data and in accordance therewith generate a second plurality of output data, wherein said second programmed circuit configuration fixedly remains in a selectable single operation configuration state prior to, during and subsequent to said processing of said second plurality of input data, and wherein said selectable single operation configuration state is defined in accordance with a selectable and subsequently fixed subset of instructions from said fixed, predefined instruction set.

20. The method of claim 19, further comprising the step of programming a third circuit portion of said integrated programmable logic circuit which is coupled to said first circuit portion to provide thereto a portion of said plurality of instructions.

21. The method of claim 19, wherein said steps of programming said first and second circuit portions of said integrated programmable logic circuit together comprise programming a field programmable gate array.

22. The method of claim 19, wherein said steps of programming said first and second circuit portions of said integrated programmable logic circuit together comprise programming a system programmable gate array.

23. The method of claim 19, wherein said steps of programming said first and second circuit portions of said integrated programmable logic circuit together comprise programming a programmable memory circuit.

24. The method of claim 23, wherein said step of programming a programmable memory circuit comprises programming an erasable programmable read only memory.

25. The method of claim 19, wherein said steps of programming said first and second circuit portions of said integrated programmable logic circuit together comprise programming a programmable array logic circuit.

26. The method of claim 19, wherein said steps of programming said first and second circuit portions of said integrated programmable logic circuit together comprise programming a programmable logic array circuit.

27. The method of claim 19, wherein said method of programming said apparatus comprises programming a computer in which said integrated programmed logic circuit is incorporated.

* * * * *